US008739147B2

(12) United States Patent
Lebert

(10) Patent No.: US 8,739,147 B2
(45) Date of Patent: May 27, 2014

(54) CLASS ISOLATION TO MINIMIZE MEMORY USAGE IN A DEVICE

(75) Inventor: Berthold M. Lebert, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 13/087,962

(22) Filed: Apr. 15, 2011

(65) Prior Publication Data

US 2012/0266149 A1  Oct. 18, 2012

(51) Int. Cl.
G06F 9/44 (2006.01)
(52) U.S. Cl.
USPC ............................. 717/166; 717/162; 717/164
(58) Field of Classification Search
None
See application file for complete search history.

(56) References Cited

U.S. PATENT DOCUMENTS

| | | | | |
|---|---|---|---|---|
| 6,901,588 | B1 * | 5/2005 | Krapf et al. | 717/164 |
| 6,938,247 | B2 | 8/2005 | Czajkowski | |
| 7,093,242 | B2 * | 8/2006 | Bernadat et al. | 717/166 |
| 7,614,045 | B2 * | 11/2009 | Kuck et al. | 717/166 |
| 7,627,655 | B2 * | 12/2009 | Bozak et al. | 709/220 |
| 7,721,277 | B1 * | 5/2010 | Thyagarajan et al. | 717/166 |
| 7,840,967 | B1 * | 11/2010 | Czajkowski et al. | 719/312 |
| 8,332,835 | B2 * | 12/2012 | Atsatt | 717/166 |
| 2004/0019887 | A1 * | 1/2004 | Taylor et al. | 717/166 |
| 2004/0143826 | A1 * | 7/2004 | Gissel et al. | 717/162 |
| 2005/0262181 | A1 * | 11/2005 | Schmidt et al. | 709/200 |
| 2005/0262493 | A1 * | 11/2005 | Schmidt et al. | 717/164 |
| 2005/0283776 | A1 * | 12/2005 | McPherson et al. | 717/162 |
| 2006/0143622 | A1 * | 6/2006 | Prabandham et al. | 719/328 |
| 2006/0271922 | A1 * | 11/2006 | Chan et al. | 717/166 |
| 2007/0061796 | A1 * | 3/2007 | Atsatt | 717/166 |
| 2007/0169069 | A1 * | 7/2007 | Burka et al. | 717/166 |
| 2007/0169072 | A1 * | 7/2007 | Corrie | 717/166 |
| 2007/0226719 | A1 * | 9/2007 | Park et al. | 717/151 |
| 2008/0126781 | A1 * | 5/2008 | Czajkowski et al. | 713/2 |
| 2010/0070960 | A1 * | 3/2010 | Atsatt | 717/166 |
| 2011/0023020 | A1 * | 1/2011 | Atsatt | 717/166 |
| 2011/0197183 | A1 * | 8/2011 | Wang | 717/166 |

OTHER PUBLICATIONS

IBM, "Dynamic proxing classloader", Sep. 7, 2004, pp. 1-3, downloaded from the Internet on Mar. 27, 2013 from Ip.com Prior Art Database, <url>: http://ip.com/pdf/ipcompad/IPCOM000031022D.pdf.*
Corrie, "Java technology, IBM style: Class sharing," 2006, pp. 1-11, downloaded from the Internet on Mar. 27, 2013 from <url>: http://www.ibm.com/developerworks/library/j-ibmjava4/.*

(Continued)

*Primary Examiner* — Thuy Dao
*Assistant Examiner* — Stephen Berman
(74) *Attorney, Agent, or Firm* — Charles L. Moore; Moore & Van Allen PLLC

(57) ABSTRACT

A method for class isolation to minimize memory usage may include receiving a request for a requested class object from an application running on a device. The method may also include retrieving a class instance for the requested class object from a memory and determining if the class instance for the requested class object corresponds to an isolated system class; determining if the class instance for the requested class object corresponds to an application class in response to the class instance not corresponding to the isolated system class; determining that the class instance for the requested class object corresponds to a shared system class in response to the class instance not corresponding to the application class and the isolated system class; and obtaining a proxy class object for the shared system class in response to the class instance for the requested class object corresponding to the shared system class.

17 Claims, 7 Drawing Sheets

(56) References Cited

OTHER PUBLICATIONS

Czajkowski, "Application Isolation in the Java™ Virtual Machine", 2000, ACM ISBN 1-58113-200-x/00/0010, pp. 1-13.*

Geoffray et al., "Towards a new Isolation Abstraction for OSGi", 2008, ACM 978-1-60558-126-2, pp. 1-5.*

Liang et al., "Dynamic class loading in the Java virtual machine," 1998, OOPSLA '98 Proceedings of the 13th ACM SIGPLAN conference on Object-oriented programming, systems, languages, and applications, pp. 36-44.*

Wallach et al., "Extensible security architectures for Java," 1997, SOSP '97 Proceedings of the sixteenth ACM symposium on Operating systems principles, pp. 116-128.*

Malabarba et al., "Runtime Support for Type-Safe Dynamic Java Classes," 2000, ECOOP 2000—Object-Oriented Programming Lecture Notes in Computer Science vol. 1850, 2000, pp. 337-361.*

* cited by examiner

CLASS ISOLATION TO MINIMIZE MEMORY USAGE IN A DEVICE

BACKGROUND

Aspects of the present invention relate to electronic devices and such devices with limited or constrained memory for running multiple applications, and more particularly to a method, device and computer program product for class isolation to minimize memory usage.

Mobile devices, such as smart phones, pad computers and the like may store and run multiple applications or apps. New apps are continuously being created that provide various types of features, functions and operations. Users of such mobile devices or platforms often run multiple independent applications or apps simultaneously or within one runtime environment. Running multiple applications within one runtime environment can require a significant amount of memory in a device that may have a limited amount of memory or is memory constrained because of other objects stored on the device, such as digital photographs, videos, music and other software and computer programs.

One example of a programming model that allow the simultaneous execution of several independent applications within one runtime environment is the Java MicroEdition (ME) space, the Mobile Information Device Profile (MIDP), v3.0 (JSR 271) on top of the Connected Limited Device Configuration (CLDC), v1.1.1 (JSR 139). Java is a trademark of Oracle in the United States, other countries or both. Multi-application environments, like the MIDP 3.0 specification, require that every application (MIDlet in the case of MIPD) be run within its own execution environment. Data and classes are not shared with other applications. This includes all system classes, like java.lang.Object or java.lang.System. Classes and their static data are not shared among applications. If a system class has a static variable, the value of that variable might be different between application A and application B. Furthermore, if application A changes the value of the static variable, then application B will not be affected by this change. For example, if an application calls java.lang.System.out.close( ) the print stream to standard out is closed for this application and for this application alone. Output to standard out from the base system or any other application currently running or launched thereafter can still pass through.

In another example, if application code synchronizes (obtains a lock) on a static variable (e.g. java.lang.System.err) then the application should not block another application which tries to obtain a lock on the same static variable.

In a further example, if application code synchronizes on a java.lang.Class instance (e.g. java.lang.Thread.getClass( )) then it can not block another application which tries to obtain a lock on the same class instance. The synchronize keyword on a static method creates such a lock on a class instance.

In the Java programming language, isolation of application classes is achieved with the class loader technique. This solves the static data isolation and name space conflicts for application classes. However, the isolation of shared system classes is still an issue. There is a need for system class isolation in a manner that is effective in terms of memory usage and performance. On some platforms, memory usage is kept to a minimum, particularly on embedded and mobile device platforms. Small differences in memory requirements can make a significant difference in cost savings in relation to the cost of the device.

BRIEF SUMMARY

According to one aspect of the present invention, a method for class isolation to minimize memory usage may include receiving a request for a requested class object from an application running on a device. The method may also include retrieving a class instance for the requested class object from a memory and determining if the class instance for the requested class object corresponds to an isolated system class. The method may additionally include determining if the class instance for the requested class object corresponds to an application class in response to the class instance not corresponding to the isolated system class. The method may further include determining that the class instance for the requested class object corresponds to a shared system class in response to the class instance not corresponding to the application class and the isolated system class. The method may additionally include obtaining a proxy class object for the shared system class in response to the class instance for the requested class object corresponding to the shared system class.

According to another aspect of the present invention, a method for class isolation to minimize memory usage may include receiving a load request from an application operating on a device to load a selected class and delegating the load request to a system isolation class loader. The method may also include determining if the selected class is a class that needs to be isolated for the application. The selected class is loaded by a system isolation class loader in response to the selected class needing to be isolated for the application. The selected class corresponds to an isolated system class in response to being loaded by the system isolation class loader. The method may also include delegating the load request to a system class loader in response to the selected class not needing to be isolated for the application. The selected class is loaded by the system class loader in response to the load request being delegated to the system class loader. The selected class corresponds to a shared system class in response to being loaded by the system class loader. The method may additionally include loading the selected class by an application class loader in response to the system class loader and the system isolation class loader being unable to load the selected class. The system class corresponds to an application class in response to being loaded by the application class loader.

According to another aspect of the present invention, a device incorporating class isolation to minimize memory usage may include a processor and a memory associated with the processor. The device may also include a system class loader running on the processor to load system classes in the memory. An application may run on the processor. An application class loader may be associated with the application to load application classes. A system isolation class loader may be associated with the application to load system isolation classes. The system isolation class loader may be adapted to generate a proxy class object in response to the application accessing a selected class corresponding to a shared system class.

According to a further aspect of the present invention, a computer program product for class isolation to minimize memory usage may include a computer readable storage medium having computer readable program code embodied therewith. The computer readable program code may include computer readable program code configured to receive a request for a requested class object from an application running on a device. The computer readable program code may also include computer readable program code configured to retrieve a class instance for the requested class object from a memory. The computer readable program code may additionally include computer readable program code configured to determine if the class instance for the requested class object corresponds to an isolated system class. The computer readable program code may also include computer readable program code configured to determine if the class instance for the requested class object corresponds to an application class in response to the class instance not corresponding to the isolated system class. The computer readable program code may additionally include computer readable program code configured to determine that the class instance for the requested class object corresponds to a shared system class in response to the class instance not corresponding to the application class and the isolated system class. The computer readable program code may further include computer readable program code configured to obtain a proxy class object for the shared system class in response to the class instance for the requested class object corresponding to the shared system class.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
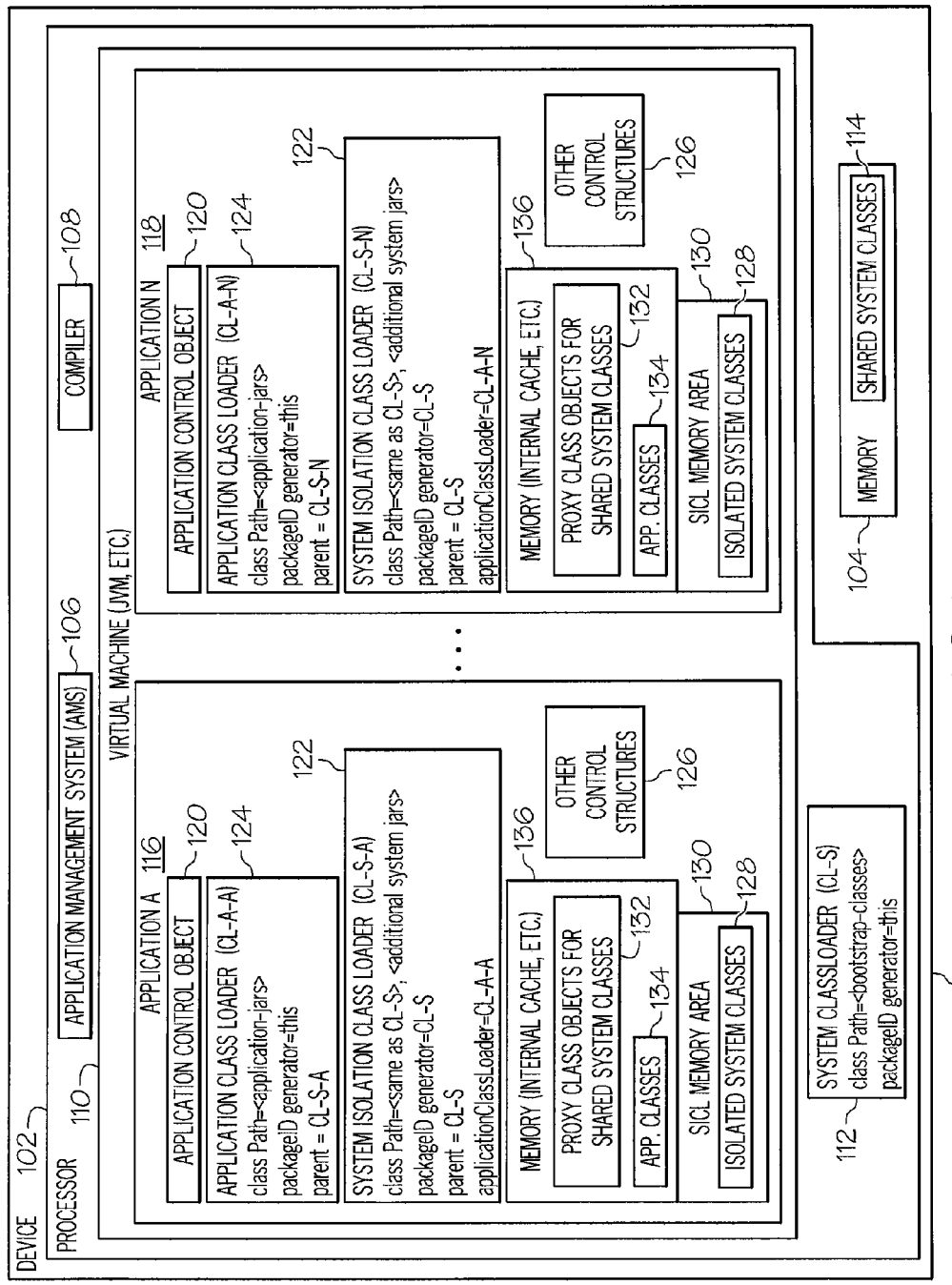
FIG. 1 is a block schematic diagram of an example of an electronic device incorporating class isolation to minimize memory usage in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, a class may define an abstract characteristic of a thing or object, such as a group of code or instructions for performing a particular operation or function. The abstract characteristics may include characteristics of the thing or object, for example attributes, fields or properties, behaviors, such as functions or methods that can be performed by the class. An object is a particular instance of a class. The set of values of the attributes of a particular object is the state of the object. The object includes the state and the behavior that is defined in the object's class. A method is an object's abilities or functions the object can perform.

In accordance with aspect of the invention, class isolation requirements to minimize the use of memory may use class proxy objects in the case a class does not have static variables. A Class proxy object is created and returned when application code accesses an instance of java.lang.Class or similar code. A Class proxy object is of the same type (java.lang.Class). The Class proxy object is unique per application and per class it represents. The Class proxy object delegates all function calls (methods) to the shared Class instance that it encapsulates. The Proxy Class object is a fraction of the size of a real Class object. There are few system classes in the Java ME CLDC configuration that have public static variables (e.g. java.lang.Boolean and java.lang.System), for which the Class proxy object technique cannot be applied to. In this case a system isolation class loader is created for every application and re-loads these system classes to ensure isolation. The system isolation class loader reuses the class code (usually stored in ROM) and loads and initializes the class, including the static variables, in the class loader's memory area (RAM segment).

FIG. 1 is a block schematic diagram of an example of an electronic device 100 incorporating class isolation to minimize memory usage in accordance with an embodiment of the present invention. The electronic device 100 may be a memory constrained device or have limited memory for running multiple applications simultaneously or in the same runtime environment. The device 100 may include a processor 102. The device 100 may also include other components (not shown in FIG. 1 for purposes of clarity) for performing particular functions and operations, such as for example, components for a smart phone, pad computer, etc., depending upon the type of the device 100. The device 100 may also include a memory 104 associated with the processor 102. An application management system (AMS) 106 and compiler 108 may also operate or run on the processor 102.

Figure 2:
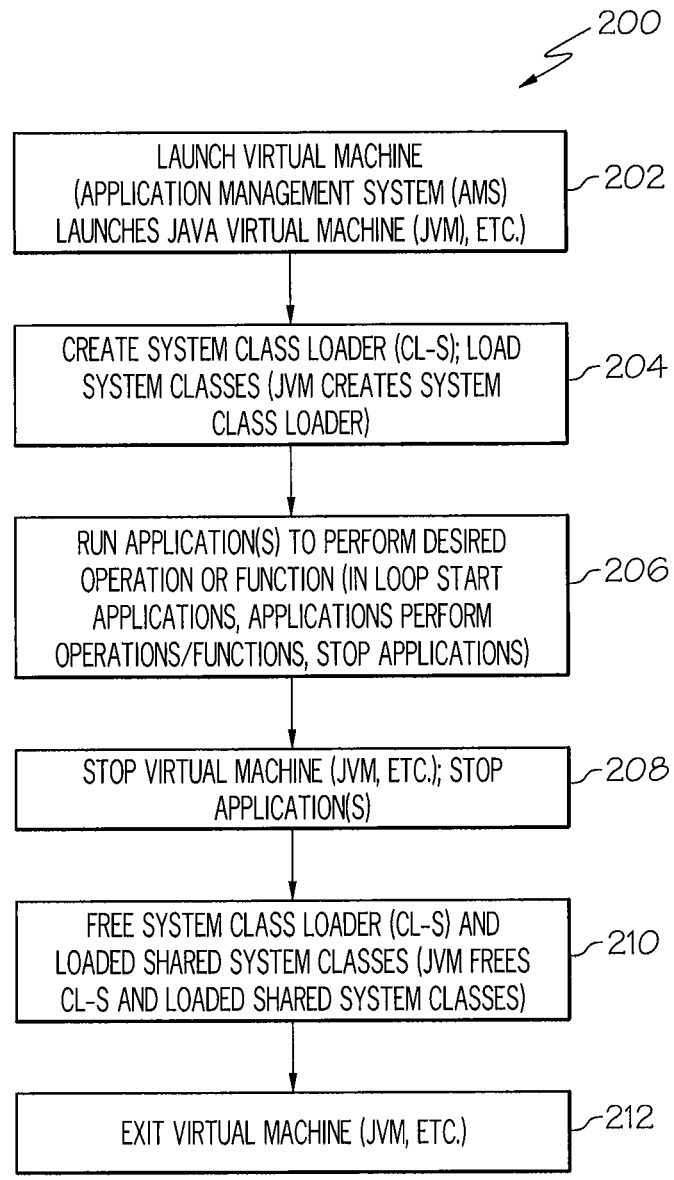
FIG. 2 is flowchart of an example of a method for running multiple applications simultaneously on an electronic device in accordance with an embodiment of the present invention.

Referring also to FIG. 2, FIG. 2 is flowchart of an example of a method 200 for running multiple applications simultaneously on an electronic device in accordance with an embodiment of the present invention. The method 200 may be embodied in and performed by the device 100 of FIG. 1 or a similar device. In block 202, a virtual machine 110 may be launched. The virtual machine 110 may be a Java Virtual Machine (JVM) or similar virtual machine or mechanism. The virtual machine 110 may be launched or started by the application management system 106.

In block 204, a system class loader (CL-S) 112 may be created or generated in response to launching the virtual machine 110. The system class loader 112 may be generated by the virtual machine 110 or JVM. At startup the virtual machine 110, JVM or the like may create the system class loader 112 just like in any other Java implementation. The system class loader 112 may also be referred to as a bootstrap class loader or base class loader. The system class loader 112 loads and initializes system classes 114 needed for the virtual machine 110 itself, the classes to implement the Java configuration and profile (e.g. CLDC 1.1.1 and MIDP 3.0), and the application management system 106. The shared system classes 114 may be stored on the memory 104.

In block 206 one or more applications, such as application A 116 to application N 118 in FIG. 1, may be launched and run on the virtual machine 110 to perform desired operations or functions. In a loop of instructions or operations within block 206, the application management system 106 may send commands to the virtual machine 110 to start a selected application or applications 116, 118, stop the selected application or applications 116, 118 and stop the virtual machine 110. An example of starting, running, and stopping an application, such as application A 116 or application N 118 will be described in more detail with reference to FIG. 3.

In block 208, the virtual machine 110 may be stopped and any applications may be stopped or terminated. In block 210, the system class loader (CL-S) 112 and loaded shared system classes 114 may be freed by the virtual machine 110. In block 212, the virtual machine 110 may be exited.

Figure 3:
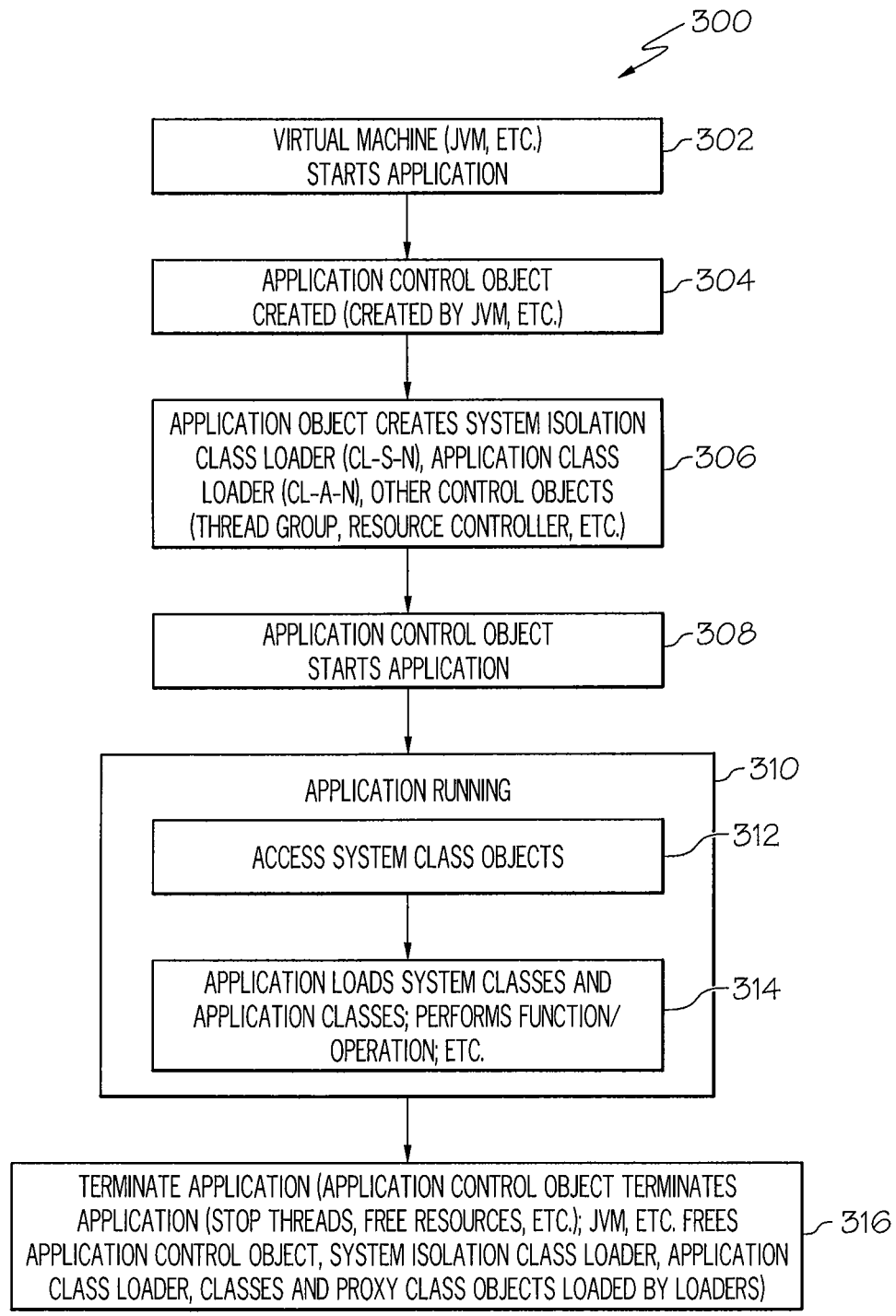
FIG. 3 is flowchart of an example of a method for starting an application on an electronic device in accordance with an embodiment of the present invention.

FIG. 3 is flowchart of an example of a method 300 for starting an application on an electronic device in accordance with an embodiment of the present invention. The method 300 may be embodied in and performed by the device 100 in FIG. 1 or a similar device. In block 302, a virtual machine, Java Virtual Machine or similar mechanism, such as virtual machine 110 in FIG. 1 may start an application or applications, such as application A 116 or application N 118.

In block 304, an application control object 120 in FIG. 1 may be created for the application. The application control object 120 may be created by the virtual machine 110. The application control object 120 represents the application. The application control object 120 may control operation of the application.

In block 306, the application control object 120 creates a system isolation class loader 122 (CL-S-N) and an application class loader (CL-A-N) 124. The application control object 120 may also create other control structures illustrated collectively by block 126 in FIG. 1. The other control structures 126 may include but are not necessarily limited to a thread group, resource controller and other structures or control devices.

The system isolation class loader 122 is described in more detail below. The application class loader 124 loads and manages the classes of one application or application classes 134. The application classes may be stored in a memory 136 or internal cache for the application 116 and 118. The application class loader 124 may operate similar to that in a standard Java implementation. The isolation class loader 122 and the application class loader 124 provide class instance and name space isolation as well as a separation between system and application classes. A class in application A 116 may have the same qualified name as a class and application N 118. The classes could be the same version or different versions. Every class loader has a unique ID which may be used to differentiate Java packages with the same names in different applications. A class and an application with the same package name as a system class does not have a package-private access to the system class. Application classes are restricted from access to internal system classes and are limited in what they can do. For example, application classes are not allowed to change system properties or load native libraries.

In block 308, the application control object 120 starts the application 116, 118. In block 310, the application begins running While the application is running, the application among other things may access system class objects as in block 312 and load system and application classes in block 314. The application may also perform functions, operations and the like. An example of a method for loading system classes and application classes will be described in more detail with reference to FIG. 4. An example of a method for accessing or obtaining class objects will be described in more detail with reference to FIG. 5.

In block 316, the application may be terminated. The application control object 120 may terminate the application. All threads are stopped, resources are freed and any other features or operations associated with the application are discontinued or released. The virtual machine 110 frees the application control object 120, the system isolation class loader 122, the application class loader 124, and classes and proxy class objects loaded by the loaders 122 and 124.

The system isolation class loaders 122 are children of the shared system class loader 112. The system isolation class loaders 122 inherit the class path of the system class loader 112. The system isolation class loaders 122 and the system class loader 112 have access to the same set of read only memory (ROM) classes (the immutable code of compiled Java classes). Additional class path entries can be specified for system classes that must be isolated, isolated system classes 128, and that do not have a "shared" representation. These class path entries for isolated system classes may be the same for all applications or specific to an application (isolated system classes 128).

The system isolation class loaders 122 also inherit the unique ID of the system class loader 112 that is used to generate the package IDs of the classes. These IDs are used when the virtual machine 110 or JVM determines if a class has access rights (visibility) of non-public members of another class. Because the IDs are the same, a class loaded by the system isolation class loader 122 has package-private visibility to classes in the same package loaded by the shared system class loader 112.

The application class loaders 124 are each a child of the associated system isolation class loader 122. The application class loader 122 of the application 116 or 118 delegates class load requests to its parent class loader or associated system isolation class loader 122.

The system isolation class loader 122 checks if the system class is isolated. These are the system classes that expose static variables, can change their internal state depending on actions performed by applications, or have static synchronized methods. There are several ways to determine if the system class should be isolated. One way is to determine if the class is in the class path container specific to the system isolation class loader 122. Another way to determine if the system class should be isolated is if the class code is tagged as "must be isolated" by a tool or some mechanism prior to deployment, or the system class is otherwise designated that it should be isolated. A further way to determine if the system class should be isolated is if the class is in a list of base system classes that should be isolated. For example, in the CLDC 1.1.1 environment the list of these classes may be limited to java.lang.Boolean and java.lang.System or similar classes.

If the system class should be isolated then system isolation class loader 122 creates the data structures in the virtual machine 110 or JVM for the isolated system classes 128 in the system isolated class loader's own memory area (RAM class) 130. The system isolation class loader 122 also perform verification and other class preparation, resolves the links to references to other classes, and executes a static initializer of the class if the class has one.

Each class instance requires a substantial amount of memory to hold the links to the superclass and the implemented interfaces, the class loader and a link to the instances, just to mention a few. Every method of a class has a random access memory (RAM) portion as well that is re-created for every application. A just-in-time compiler (JIT), such as compiler 108, if present may recompile any "hot" methods per class instance as the execution context may be different.

If the requested class does not have to be isolated, then the system isolation class loader 122 delegates to the shared system class loader 112. This keeps the number of class instances low and minimizes the usage of memory. Applications are able to access the class instance of a shared class using a proxy class object 132.

Applications can get access to shared class instances using the proxy class object 132 with a defined application program interface (API). In Java ME CLDC configuration applications can get access to the class instances with the following API:
 public final Java.lang.Class java.lang.Object.get Class ( )
 public static Java.lang.Class Java.lang.Class.forName (java.lang.String className)

The compiler 108 converts the keyword class to forName ( )method call. For example, the source code java.lang.Object.class results in the same binary code as java.lang.Class.forName ("java.lang.Object").

Some Java configurations include additional deflection capabilities, for example, in the java.lang.Class and the java.lang.reflect package. The multi-application environments that ensure application isolation access to this extended reflection is restricted to trusted system classes. If applications would be allowed to access, then the relevant methods are modified in a similar fashion as java.lang.Object.getClass( ).

Access to native methods, for example Java native interface (JNI) may be restricted to trusted system code in the multi-application environments. Hence applications will not be able to access class instances through native code. The java.lang.Object.getClass ( ) and java.lang.class.forName( ) methods are modified to check if the calling code is an application by inspecting the classes on the call stack. If the calling code is system code, then the class object will be returned, otherwise the system isolation class loader for the application will be asked for the class object. The system isolation class loader returns the class object if it was loaded by the class loader. In this case the class is already isolated. If the class was loaded by the shared system class loader 112 then the system isolation class loader creates a proxy class object 132 for the system class. The system isolation class loader 122 caches the proxy class object 132 for later use by the same application. An application should always get the same proxy class object for the same class instance and the proxy class object should be a different one for other applications. The proxy class object 132 wraps or encapsulates the associated shared system class and the proxy class object 132 behaves in the same manner as its associated system class. The proxy class object 132 delegates method calls to the encapsulated shared system class.

In this implementation the system will not create a RAM class in the virtual machine 110 or JVM for the shared system class, thereby reducing the memory consumption substantially. Furthermore the shared system class is not loaded, verified or initialized again and again for every launched application.

The proxy class objects 132 are garbage collected when the system isolation class loader 122 is freed. This occurs after the application loading the system isolation class loader 122 is stopped or terminated.

Figure 4:
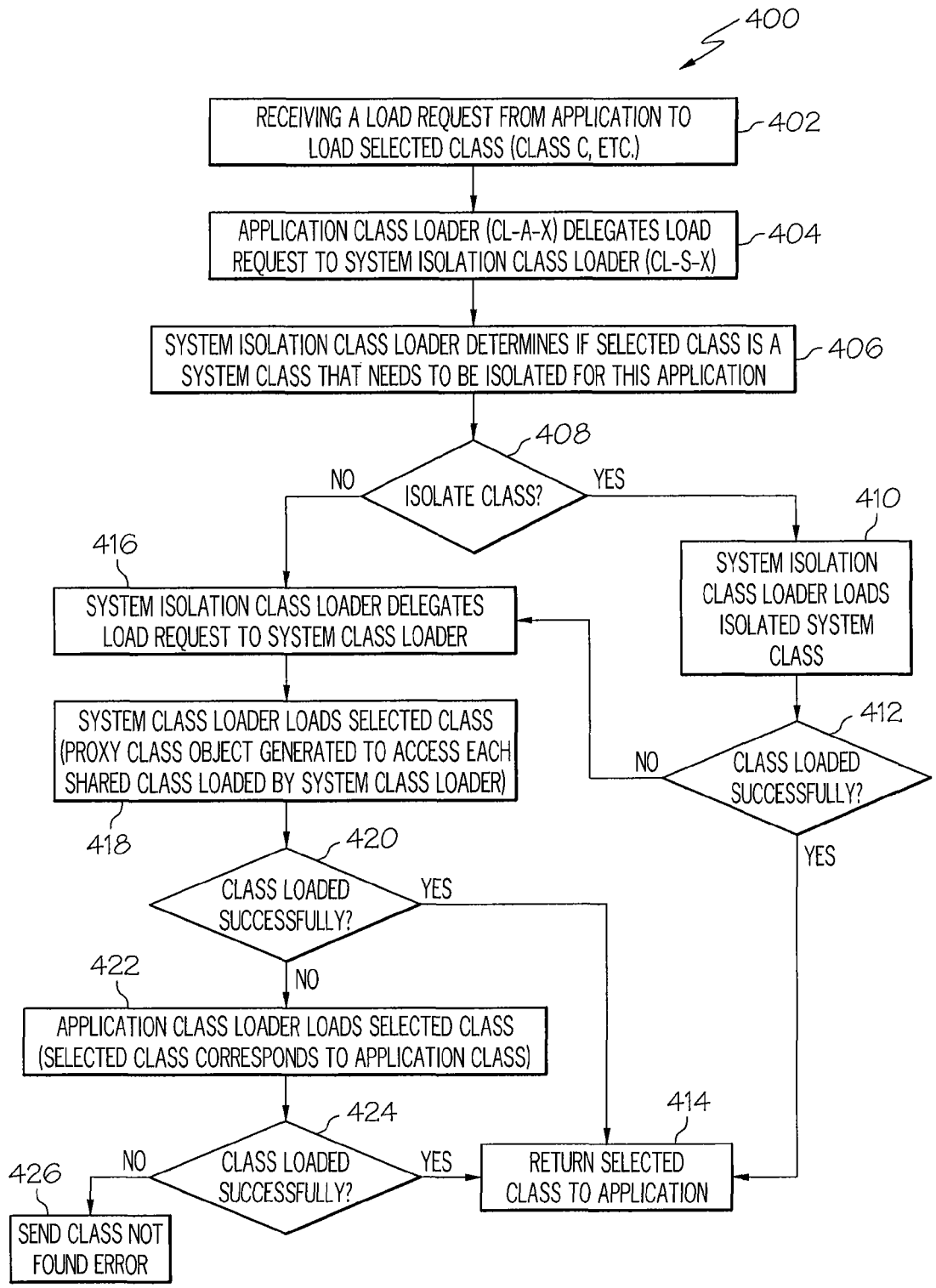
FIG. 4 is flowchart of an example of a method for loading classes in response to starting an application on an electronic device in accordance with an embodiment of the present invention.

FIG. 4 is flowchart of an example of a method 400 for loading classes in response to starting an application on an electronic device in accordance with an embodiment of the present invention. The method 400 may be embodied in and performed by the device 100 in FIG. 1 or another similar device. In block 402, a load request may be received from an application to load a selected class.

In block 404, the application class loader 124 may delegate the load request to the system isolation class loader 124. In block 406, the system isolation class loader may determine if the selected class is a system class that needs to be isolated for this application. In block 408, if the selected class needs to be isolated as the method 400 may advance to block 410. If the selected class does not need to be isolated for the application, the method 400 may advance to block 416.

In block 410, the system isolation class loader 122 tries to load the isolated system class. In block 412, a determination may be made if the isolated system class loaded successfully. If the isolated system class loaded successfully, the method 400 may advance to block 414. In block 414 the selected class or isolated system class may be loaded or returned to the application. If the isolated system class did not load successfully in block 412, the method 400 may advance to block 416.

In block 416 the system isolation class loader 122 delegates the load request to the system class loader 112 or shared system class loader shared by all of the applications. In block 418, the system class loader 112 tries to load the selected class. As previously discussed a proxy class object 132 may be generated to access each shared class loaded by the system class loader 112.

In block 420, a determination may be made if the class loaded successfully. If the class loaded successfully the method 400 may advance to block 414 and the proxy class object may be loaded or returned to the application.

If the class did not load successfully in block 420, the method 400 may advance to block 422. In block 422, the application class loader 124 loads or tries to load the selected class. The selected class corresponds to an application class 134 if the selected class is successfully loaded by the application class loader 124. The application classes may be stored in a memory 136 or internal cache associated with the particular application 116 or 118.

In block 424, a determination is made if the class loaded successfully. If the class loaded successfully the method 100 may advance to block 414 and the selected class or application class is loaded or returned to the application. If the class did not load successfully in block 424 the method 400 may advance to block 426. In block 426, a class not found error may be sent or another message or indication may be generated.

Figure 5:
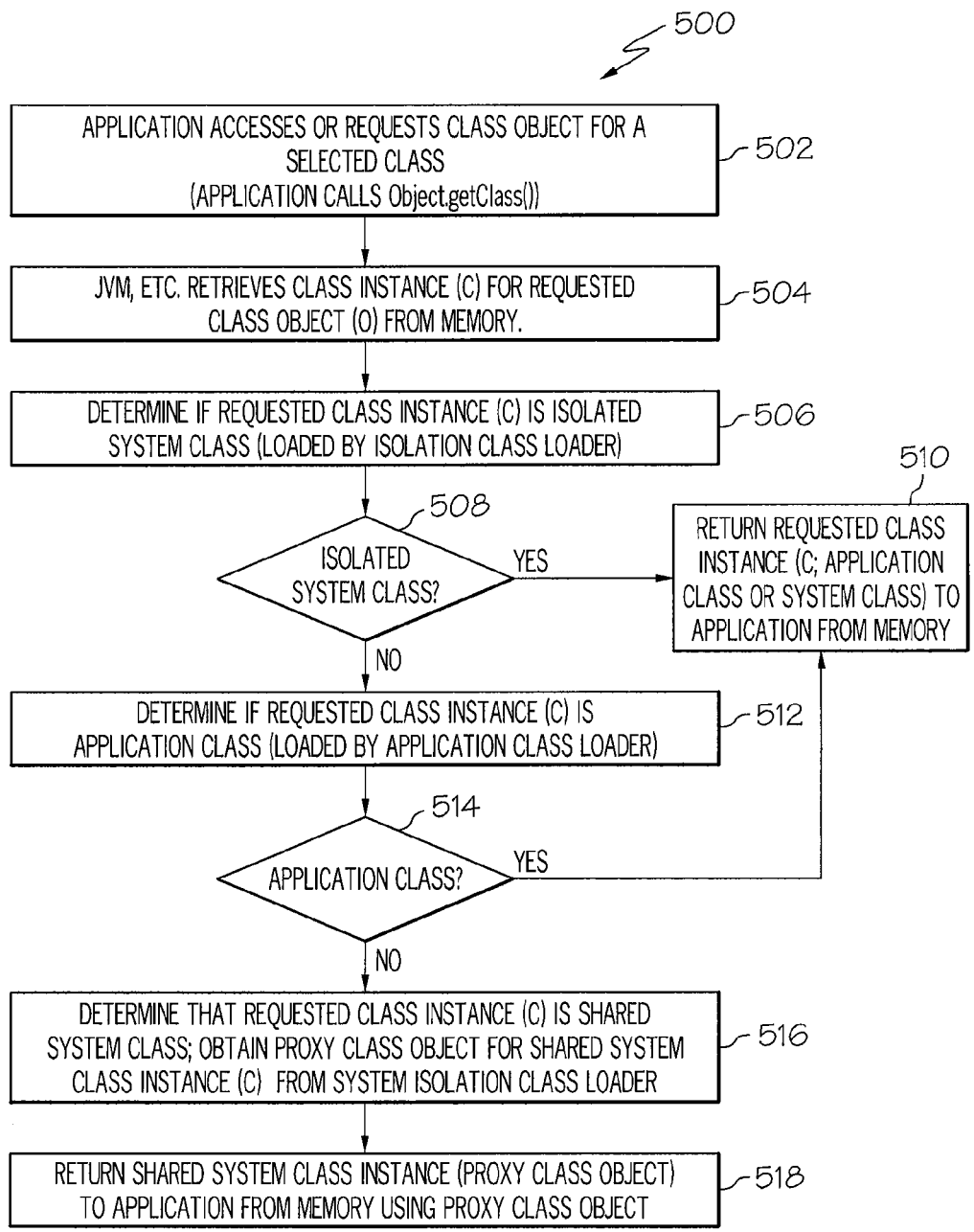
FIG. 5 is flowchart of an example of a method for accessing or obtaining a class object when needed during running of an application on an electronic device in accordance with an embodiment of the present invention.

FIG. 5 is flowchart of an example of a method 500 for accessing or obtaining a class object when needed during running of an application on an electronic device in accordance with an embodiment of the present invention. The method 500 may be embodied in and performed by the device 100 and FIG. 1 or by another similar device. In block 502, an application may access or request a class object for a selected class. The application may call Object.getClass( ).

In block 504, the virtual machine 110 or JVM may retrieve a class instance for the requested class object from memory. In block 506, a determination may be made if the requested class instance for the requested class object is or corresponds to an isolated system class. The requested class object for the requested class will be an isolated system class if the class was loaded by the isolation class loader 122 similar to that previously described.

If the class instance for the requested class object is an isolated system class in block 508, the method 500 advances to block 510. In block 510, the requested class instance is returned to the application from memory. The class instance returned to the application will be a system class instance since the class instance for the requested class object corresponds to an isolated system class in block 506.

If the class instance for the requested class object is not an isolated system class or does not correspond to an isolated system class, the method 500 may advance to block 512. In block 512, a determination is made if the requested class instance for the requested class object is an application class or corresponds to an application class in response to the class instance not corresponding to the isolated system class in block 508. As previously discussed, the class instance is an application class or corresponds to an application class if the class is loaded by the application class loader 124.

In block 514, if the class instance for the requested class object is an application class the method advances to block 510. In block 510, an application class instance is returned to the application in response to the class instance for the requested class object being an application class or corresponding to the application class since the class was loaded by the application class loader 124.

If the class instance is not an application class in block 514 the method 500 may advance to block 516. In block 516, a determination may be made whether the class instance for the requested class object is a shared system class or corresponds to a shared system class. A proxy class object for the shared system class is obtained in response to the class instance for the requested class object being a shared system class. An example of a method for obtaining a proxy class object will be described in more detail with reference to FIG. 6. In block 518, the shared system class instance may be returned to the application from memory using the proxy class object.

Figure 6:
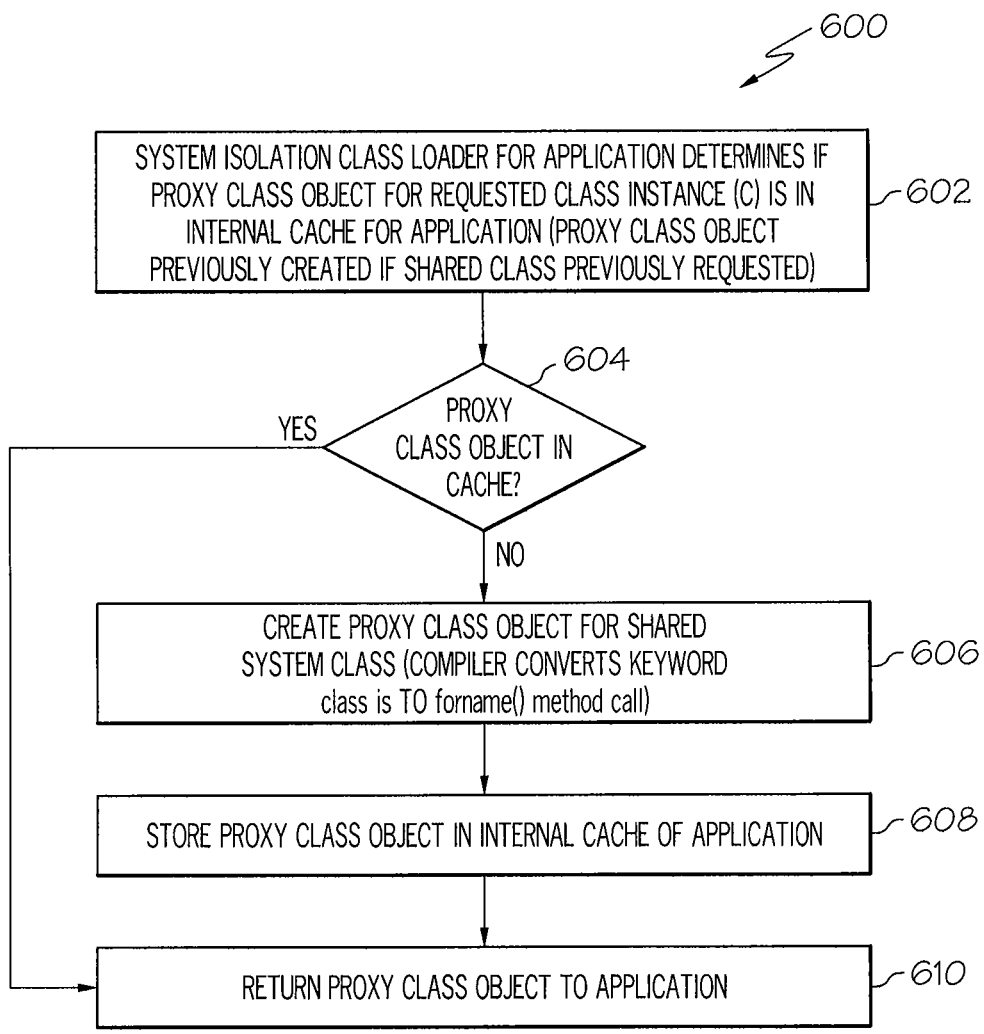
FIG. 6 is flowchart of an example of a method of obtaining a proxy class object for obtaining a shared system class object when needed during running of an application on an electronic device in accordance with an embodiment of the present invention.

FIG. 6 is flowchart of an example of a method 600 for obtaining a proxy class object for a shared system class object when needed during running of an application on an electronic device in accordance with an embodiment of the present invention. The method 600 may be embodied in and performed by the device 100 in FIG. 1 or by another similar device. In block 602, a system isolation class loader 122 for the application may determine if the proxy class object 132 for the requested class instance is in an internal cache 136 for the application. The proxy class object 132 will be stored in the internal cache 136 if the proxy class object 132 was previously created in response to the shared system class being previously requested by the application.

In block 604, a determination may be made if the proxy class object 132 is in the cache 136. If the proxy class object 132 is in the cache 136, the method 600 may advance to block 610 and the proxy class object 132 may be returned to the application. If the proxy class object 132 has not previously been created and stored in the cache 136, the method 600 may advance to block 606.

In block 606, the proxy class object 132 for the shared system class may be created. Similar to that previously described the proxy class object 132 may be created by creating a new object of java.lang.Class, and setting its internal class loader field to the system isolation class loader 122 and its internal pointer to the RAM class in JVM memory 104 to the same value as the pointer in the shared system class 114. In block 608, the proxy class object 132 may be stored in the internal cache 136 of the application. The proxy class object 132 may be returned to the application in block 610 similar to that previously described.

Figure 7:
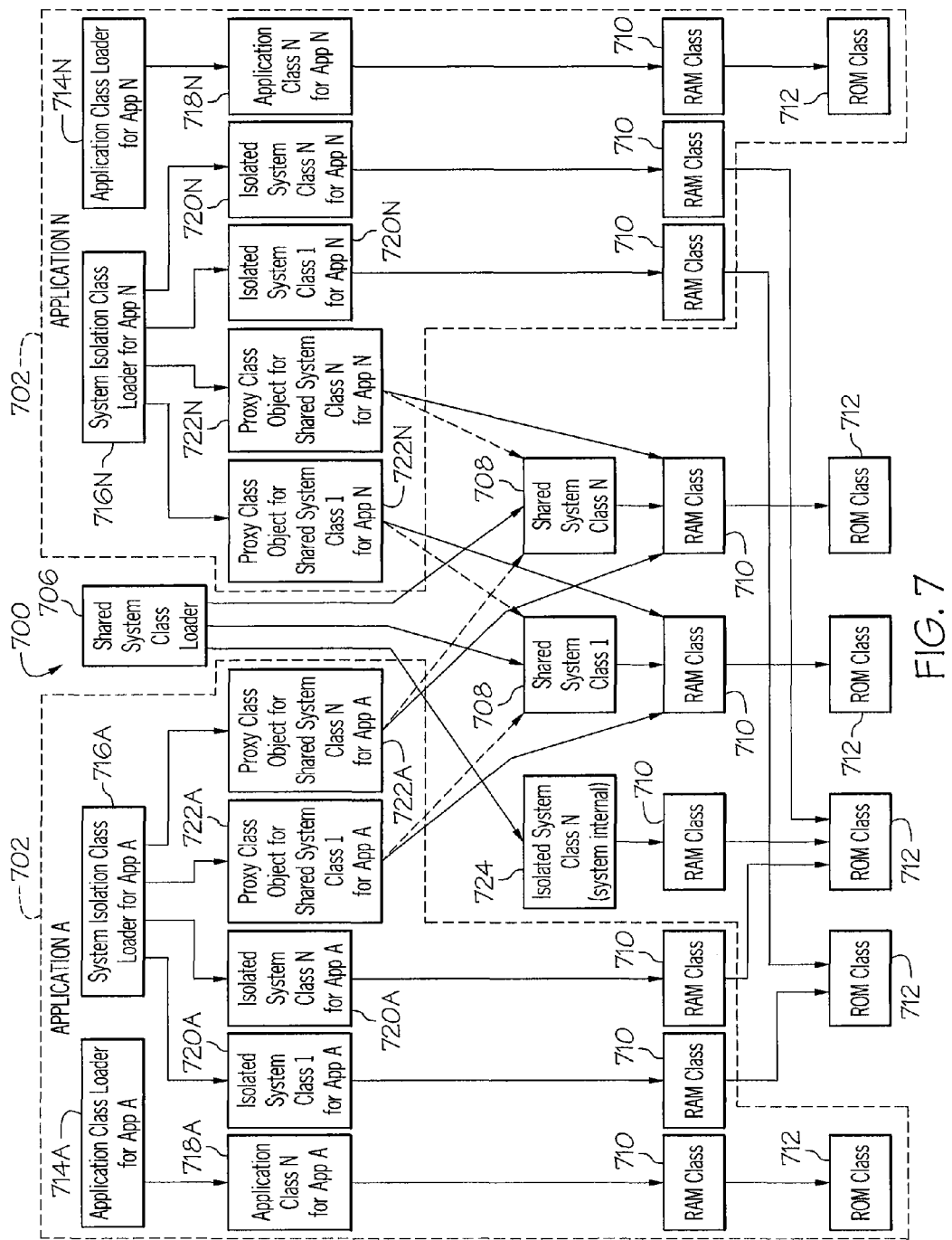
FIG. 7 is an exemplary representation of the classes loaded in memory by the virtual machine or Java virtual machine in FIG. 1 illustrating the relationship between the classes for each application in accordance with an embodiment of the present invention.

FIG. 7 is an exemplary representation 700 of the classes loaded in memory by the virtual machine or Java virtual machine in FIG. 1 illustrating the relationship between the classes for each application 702-704 in accordance with an embodiment of the present invention. As previously discussed with respect to the device 100 in FIG. 1, a shared system class loader 706 loads the shared system classes 708 provided by a JVM provider. The shared system class loader 706 is the same as the system class loader 112 in FIG. 1. Each class 708 or class object points to a RAM class 710 in memory or in the JVM buffers. Each RAM class 710 may contain variable class fields, such as for example pointers to a super class, implemented interfaces, space for static variables, space for JVM internal use or class fields for other data. Each RAM class 710 points to a ROM class 712. Each ROM class 708 may contain code and other immutable attributes that may be used by the applications The shared system class loader 706 and the classes 708 loaded by the shared system class loader 706 are not directly accessible by the applications 702-704.

As previously discussed, each application (application A 702 to application N 704) has two class loaders, an application class loader 714A and 714N and a system isolation class loader 716A and 716N, respectively. The application class loader 714A, 714N loads the application class 718A, 718N provided by the application developer or provider. These classes 718A and 718N are isolated and have their own their own class data or RAM class 710, and code or ROM class 712 in the memory or JVM buffers.

The system isolation class loader 716A and 716N loads the system classes provided by the virtual machine or JVM provider. The system classes may fall into two categories: a system class that can contain different data per application and a system class that cannot contain different data per application. The system class that may contain different data per application is "reloaded." A new class object or isolated system class 720A, 720N is created for each application 702-704. The code or ROM class 712 may be shared among the applications 702-704

The system class that cannot contain different data per application is not "reloaded." A new class object or proxy class object, 722A, 722N, is created that shares the class data or RAM class 710, and code or ROM class 712 with the existing shared system class 708.

The shared system class loader 706 may also load an isolated system class 724 for internal use by the system. The isolated system class 724 may point to its own class data or RAM class 710 but the ROM class 712 may be shared with the corresponding isolated system classes 720A, 720N for each application 702, 704.

Accordingly, by sharing data and code or RAM classes and ROM classes by applications significantly less memory is utilized on devices, especially memory constrained devices, such as smart phones, pad computers and similar devices, and functions or operations may run more efficiently because shared data or code does not need to be reloaded and can be readily accessed and utilized by multiple applications in one runtime environment.

Applications can create objects of system classes by invoking a constructor method or a factory method. Constructor methods return a new instance of the system object per caller by design. Applications will not be able to share objects created in this way. Factory methods might return the same object regardless of the applications. These methods of system classes are re-factored to return an object unique to the calling application or the class is isolated using a system isolation class loader as described above.

Static synchronized methods and system classes should be avoided. They may be rewritten to use internal monitors per application. If this is not possible then the class may be isolated by "re-loading" the class with the system isolation class loader.

System classes that are expose public static fields, like java.lang.System.out are isolated by re-loading the class with the system isolation class loader.

Some functionality in system classes may be rewritten to ensure proper isolation between applications. For example, the java.lang.System class may be modified to intercept the close ( ) call. The print streams for System.err and System.out may close the stream for the current application without affecting the streams of the base system and other applications.

The system class java.lang.Class is final, so subclasses that could introduce problems are not permitted.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method executed by a processor for class isolation to minimize memory usage, comprising:
   receiving a request for a requested class object from an application running on a device;
   retrieving a class instance for the requested class object from a memory;
   determining if the class instance for the requested class object corresponds to an isolated system class;
   determining if the class instance for the requested class object corresponds to an application class in response to the class instance not corresponding to the isolated system class;
   determining that the class instance for the requested class object corresponds to a shared system class in response to the class instance not corresponding to the application class and the isolated system class; and
   obtaining a proxy class object for the shared system class in response to the class instance for the requested class object corresponding to the shared system class.

2. The method of claim 1, further comprising returning the shared system class instance corresponding to the requested class object to the application using the proxy class object in response to the class instance for the requested class object corresponding to the shared system class.

3. The method of claim 1, further comprising determining if the proxy class object is stored in an internal cache for the application, the proxy class object having been previously created and stored in the internal cache in response to a previously requested class object corresponding to the shared system class.

4. The method of claim 3, further comprising:
   creating the proxy class object in response to the proxy class object not being in the internal cache; and
   storing the proxy class object in the internal cache for subsequent use by applications.

5. The method of claim 4, wherein creating the proxy class object comprises converting a keyword class to a forName( ) method call.

6. The method of claim 1, further comprising returning a system class instance to the application in response to the class instance for the requested class object corresponding to the isolated system class.

7. The method of claim 1, further comprising returning an application class instance to the application in response to the class instance for the requested class object corresponding to the application class.

8. The method of claim 1, further comprising:
   receiving a load request from the application operating on the device to load a selected class;
   delegating the load request to a system isolation class loader;
   determining if the selected class is a class that needs to be isolated for the application;
   loading the selected class by a system isolation class loader in response to the selected class needing to be isolated for the application, the selected class corresponding to the isolated system class in response to being loaded by the system isolation class loader;
   delegating the load request to a system class loader in response to the selected class not needing to be isolated for the application;
   loading the selected class by the system class loader in response to the load request being delegated to the system class loader, the selected class corresponding to the shared system class in response to being loaded by the system class loader; and
   loading the selected class by an application class loader in response to the system class loader and the system isolation class loader being unable to load the selected class, the selected class corresponding to an application class in response to being loaded by the application class loader.

9. The method of claim 8, further comprising generating the proxy class object in response to the selected class being loaded by the system class loader and the application accessing the selected class.

10. A device incorporating class isolation to minimize memory usage, comprising:
    a processor;
    a memory associated with the processor;
    a system class loader running on the processor to load system classes in the memory;
    an application running on the processor;
    an application class loader associated with the application to load application classes; and
    a system isolation class loader associated with the application to load system isolation classes, wherein the system isolation class loader is adapted to determine if a selected class needs to be isolated for the application, the system isolation class loader loading the selected class in response to the selected class needing to be isolated and delegating loading of the selected class to the system class loader in response to the selected class not needing to be isolated, the system isolation class loader being adapted to generate a proxy class object in response to the application accessing the selected class corresponding to a shared system class loaded by the system class loader, wherein the proxy class object comprises:
    an internal class loader field set to the system isolation class loader; and
    an internal pointer to a class in the memory with a same value as a pointer in the shared system class.

11. The device of claim 10, further comprising a cache for storing the proxy class object in response to the proxy class object being generated for calls for the shared system class by the application and other applications.

12. The device of claim 11, wherein the proxy class object is returned to the application in response to the application accessing the selected class corresponding to the shared system class.

13. The device of claim 10, further comprising:
a virtual machine on the processor, the virtual machine comprising:
- a module for receiving a request for a requested class object from the application running on the device;
- a module for retrieving a class instance for the requested class object from the memory;
- a module for determining if the class instance for the requested class object corresponds to an isolated system class;
- a module for determining if the class instance for the requested class object corresponds to an application class in response to the class instance not corresponding to the isolated system class;
- a module for determining that the class instance for the requested class object corresponds to the shared system class in response to the class instance not corresponding to the application class and the isolated system class; and
- a module for obtaining the proxy class object for the shared system class in response to the class instance for the requested class object corresponding to the shared system class.

14. A computer program product for class isolation to minimize memory usage, the computer program product comprising:
a non-transitory computer readable storage medium having computer readable program code embodied therewith, the computer readable program code comprising:
computer readable program code configured to receive a request for a requested class object from an application running on a device;
computer readable program code configured to retrieve a class instance for the requested class object from a memory;
computer readable program code configured to determine if the class instance for the requested class object corresponds to an isolated system class;
computer readable program code configured to determine if the class instance for the requested class object corresponds to an application class in response to the class instance not corresponding to the isolated system class;
computer readable program code configured to determine that the class instance for the requested class object corresponds to a shared system class in response to the class instance not corresponding to the application class and the isolated system class; and
computer readable program code configured to obtain a proxy class object for the shared system class in response to the class instance for the requested class object corresponding to the shared system class.

15. The computer program product of claim 14, wherein the computer readable program code further comprises computer readable program code configured to return a system class instance to the application in response to the class instance for the requested class object corresponding to the isolated system class.

16. The computer program product of claim 14, wherein the computer readable program code further comprises computer readable program code configured to return an application class instance to the application in response to the class instance for the requested class object corresponding to the application class.

17. The computer program product of claim 14, wherein the computer readable program code further comprises:
computer readable program code configured to receive a load request from the application operating on the device to load a selected class;
computer readable program code configured to delegate the load request to a system isolation class loader;
computer readable program code configured to determine if the selected class is a class that needs to be isolated for the application;
computer readable program code configured to load the selected class by a system isolation class loader in response to the selected class needing to be isolated for the application, the selected class corresponding to the isolated system class in response to being loaded by the system isolation class loader;
computer readable program code configured to delegate the load request to a system class loader in response to the selected class not needing to be isolated for the application;
computer readable program code configured to load the selected class by the system class loader in response to the load request being delegated to the system class loader, the selected class corresponding to the shared system class in response to being loaded by the system class loader; and
computer readable program code configured to load the selected class by an application class loader in response to the system class loader and the system isolation class loader being unable to load the selected class, the system class corresponding to an application class in response to being loaded by the application class loader.

* * * * *